Dec. 20, 1949  B. A. WELLS  2,491,842
ACTUATOR SYSTEM
Filed May 11, 1945
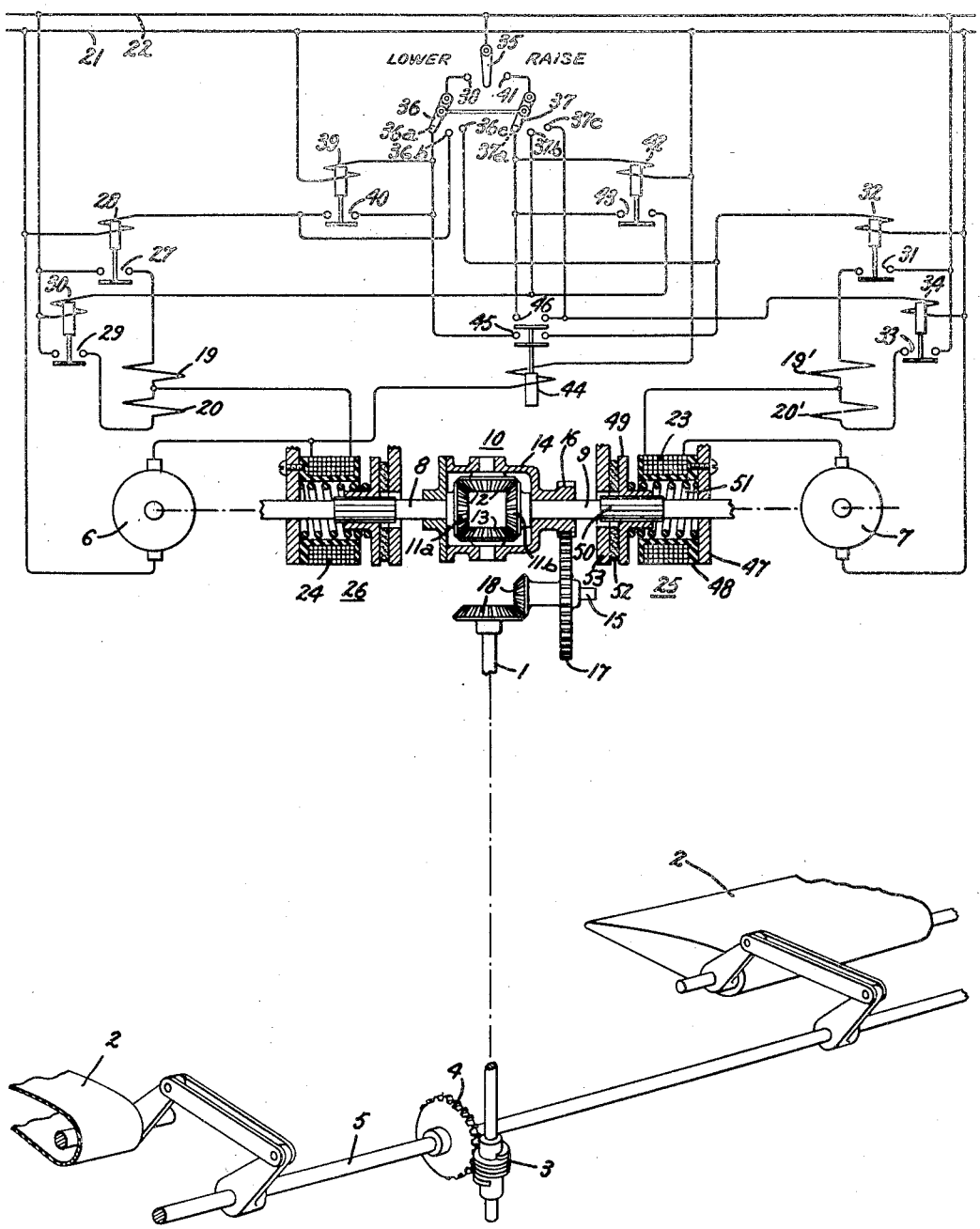
Inventor:
Bruce A. Wells,
by Harry E. Dunham
His Attorney.

Patented Dec. 20, 1949

2,491,842

UNITED STATES PATENT OFFICE 2,491,842

ACTUATOR SYSTEM

Bruce A. Wells, Schenectady, N. Y., assignor to General Electric Company, a corporation of New York Application May 11, 1945, Serial No. 593,309

1 Claim. (Cl. 318—8)

The present invention relates to an actuator system of the multiple drive motor type which may be used to operate or control a remote device.

Actuators are now being widely used on aircraft for actuating wing flaps, landing gear, and the like. For such applications reliability of operation is considered sufficiently important to warrant the use of multiple drive motors so that the system will still be operative in case of a failure of one of the drive motors. To secure the desired reliability of operation it has been proposed heretofore to use a stand-by motor of the same size and capacity as the normally operative motor, and to provide clutching or other means for connecting the stand-by motor to operate the actuator system in case of failure of the normally operative motor. While such a system provides the desired reliability, it is very inefficient from a weight standpoint as the weight of the normally idle motor is added to the system.

Accordingly, it is an object of my invention to provide an improved actuator system which gives the desired reliability of operation but which is lighter in weight than the multiple drive systems used heretofore.

A more specific object of my invention is to provide an actuator system which has the reliability afforded by the use of a multiple drive motor but which permits the use of smaller and lighter weight drive motors by using the extra motor to supply part of the required power during normal operation.

Another object of my invention is to provide an actuator system which applies power gradually to the load device thereby giving smooth operation and avoiding high transient stresses in the operated equipment.

A still further object of the present invention is to provide an electrically operated actuator system which draws a relatively low inrush starting current, thereby facilitating the design of suitable overload protection for the electrical supply system.

Another object of the present invention is to provide an actuator system which gives improved flexibility and reliability of operation.

Further objects and advantages of my invention will become apparent as the following description proceeds, and its scope will be pointed out in the appended claim.

For a better understanding of my invention, reference should be made to the following detailed description taken in connection with the accompanying drawing in which the single figure shows a schematic representation of my improved actuator system shown as being utilized to operate the wing flaps of an aircraft.

Referring to the drawing, I have illustrated my improved actuator system as being connected to drive a load shaft 1 which may be connected to operate the wing flaps 2 of an aircraft through a suitable mechanical connection and gear reduction comprising the worm gear 3 mounted on the load shaft 1 and a cooperating gear 4 keyed to an operating shaft 5 which is linked to the flaps 2, as shown. With such an arrangement it will be apparent that the flaps 2 of the aircraft will be lowered or raised, depending upon the direction of rotation of the load shaft 1.

The actuator system comprises a pair of electric drive motors 6 and 7 which are connected respectively to input shafts 8 and 9 of a differential gear 10. The differential gear 10 is shown as comprising a pair of bevel gears 11a and 11b which are keyed to the input shafts 8 and 9, and which mesh with bevel gears 12 and 13 carried on a rotatable spider 14, the spider being freely mounted on the shafts 8 and 9. Rotational movement of the spider 14 is transmitted to an output shaft 15 by means of a spur gear 16 connected to the spider and a co-acting spur gear 17 mounted on and connected to the output shaft 15. The output shaft 15 is shown as geared to the load shaft 1 by means of suitable bevel gears 18.

Due to the inherent nature of a differential gear, the speed of the output shaft 15 is proportional to the sum of the speeds of the two input shafts 8 and 9. According to one aspect of my invention I make use of this fact to obtain, in a multiple motor actuating system, what amounts to an automatic gear reduction in case of failure of one of the drive motors. Thus, for example, suppose that during operation one of the drive motors, say motor 6, fails. In this case drive motor 7 will continue to deliver normal torque to the load shaft 1, the speed of which is automatically reduced to one-half normal speed by what amounts to a two-to-one gear reduction. Therefore, the remaining motor 7 continues to operate at normal rated load whereby any overloading of the motor is prevented while at the same time full torque is available at the load shaft 1 to operate the wing flaps 2 or any other connected load device. While it is true that the load device will be operated at only one-half normal speed when only one motor is operating, this is not considered particularly disadvantageous for emergency operation in view of the weight saving and other benefits which are obtained with this system, as will be presently described. Therefore with this system motors 6 and 7 may be selected such that each motor has only one-half the rated output power required to operate the load device at normal speed whereby a considerable economy in the weight is affected over a multiple motor system wherein the normally operative motor and the normally idle standby motor each has sufficient power to deliver normal torque to the load at rated speeds.

In order to permit operation of the load shaft 1 in either direction, means are provided for reversing the direction of rotation of the actuator motors 6 and 7. While the drive motors 6 and 7 may be of any suitable type, I have shown them as being of the split-field series type, the motors being provided with forward and reverse field windings 19, 19' and 20, 20'. As shown, the drive motors 6 and 7 are energized from any suitable source of direct current indicated by the supply lines 21 and 22. Both motors have one side of the armature permanently connected to the supply line 21, and the other side of the armature connected to the common connection of the fields 19, 19' and 20, 20' through solenoid windings 23 and 24 of shaft-locking devices 25 and 26, the function of which will be presently described. The remaining terminal of the forward field winding 19 of the drive motor 6 is connected to the direct current supply line 22 through the normally open contacts 27 of a forward contactor 28. The remaining terminal of the reverse field winding 20 is connected to the power supply line 22 through the normally open contacts 29 of a reverse contactor 30. In a similar manner, the remaining terminal of the forward field winding 19' of the motor 7 is connected to the direct current supply line 22 through the normally open contacts 31 of a forward contactor 32. Also, the remaining terminal of the reverse field winding 20' is connected to the direct current supply line 22 through the normally open contacts 33 of a reverse contactor 34. With this arrangement it will be clear that the direction of rotation of the drive motors 6 and 7 may be controlled by selectively energizing the forward contactors 28 and 32 and the reverse contactors 30 and 34.

In order to provide means for controlling the direction of operation of the actuator system and the connected wing flaps 2, there is provided a reversing switch 35 which may be actuated either to the left or right from a neutral position shown to control the direction of operation of the actuator system. For emergency operation there are also provided two ganged selector switches 36 and 37 which are normally positioned in the left position, as shown, but which may, under emergency conditions, be positioned to the center and right positions to secure selective operation of the actuator motors 6 and 7, as will be more fully described.

When the selector switches 36 and 37 are in the left position and reversing switch 35 is moved to the left position in which it engages a stationary contact 38, a circuit is completed through switch 36 to the energizing coil of an interlocking relay 39 which operates normally open contacts 40. The energization of relay 39 causes closure of contacts 40 whereupon a circuit is completed to the energizing coil of the forward contactor 28 for the drive motor 6, whereupon the drive motor 6 operates in a forward direction which may be assumed to be in a direction to cause a lowering of the wing flaps 2. On the other hand, if the reversing switch 35 is moved to the right in a position where it engages the stationary contact 41, a circuit is completed through switch 37 causing energization of an interlock relay 42 which is provided with normally open contacts 43. Energization of the interlock relay 42 causes closure of the contacts 43 whereby a circuit is completed to the energizing coil of the reverse contactor 30 whereupon the motor 6 operates in a reverse direction which may be considered to be in a direction to raise the wing flaps 2.

According to another aspect of my invention, a switching arrangement is provided whereby the actuator motors 6 and 7 are energized in sequence rather than simultaneously. With this arrangement a more gradual starting of the load is obtained whereby high transient stresses are avoided. Also with this arrangement the peak inrush currents of the motors 6 and 7 are staggered, whereby the total inrush current is decreased thereby facilitating the design of suitable overload protection for the electrical supply system.

Sequential operation of the drive motors 6 and 7 is obtained by the provision of interlock means in the control circuit for preventing energization of either the forward or reverse contactors controlling the motor 7 until after the motor 6 has come up to speed. For this purpose there is provided an interlock relay 44, the energizing coil of which is connected across the armature of the motor 6 so that it is energized in accordance with the back EMF voltage across the motor. The interlock relay 44 is adjusted so that it does not pick up until the back EMF across the armature of the motor 6 corresponds to an operating speed of the motor which is considerably above that at which peak inrush current is drawn. For example, a relay 44 may be adjusted to pick up when the motor 6 has reached three-quarters of the normal operating speed. The interlock relay 44 is provided with two sets of normally open contacts 45 and 46 which are connected respectively in the energizing circuits of the forward and reverse contactors 32 and 34 controlling the drive motor 7. Thus it will be noted that when the reversing switch 35 is in the left or flap-lowering position, the forward contactor 32 controlling actuator motor 7 cannot be energized until interlock relay 44 is energizing closing contacts 45. Similarly, when the reversing switch 35 is in the right or flap-raising position, the reverse contactor 34 controlling the drive motor 7 cannot be energized until interlock relay 44 is energizing closing contacts 46. Since interlock relay 44 is not picked up until the actuator motor 6 has obtained a substantial operating speed as explained above, it will be clear that this arrangement provides for sequential starting of the motors 6 and 7.

In using the system, a situation may arise in which either actuator motor 6 or 7 may jam or otherwise become inoperative. If such a condition should occur, it is desirable to be able to operate either motor 6 or 7 in either direction independently of the other motor. It is for this purpose that the ganged switches 36 and 37 are provided. Normally, the switches 36 and 37 are positioned in the left position in which they engage contacts 36a and 37a respectively whereby sequential operation of the drive motors 6 and 7 is obtained as explained above. If for some reason the drive motor 7 should jam or otherwise fail, the ganged switches 36 and 37 may be moved to the center position in which they engage respectively the stationary contacts 36b and 37b. When moved to this position, the interlock relays 39 and 42 are by-passed and the forward and reverse contactors 28 and 30 controlling the drive motor 6 are energized directly in response to movements of the reversing switch 35 to the "raise" and "lower" positions. It will also be noted that, due to the fact that the interlock relays 39 and 42 remain deenergized for this condition of operation, it is impossible for the energizing circuit to the forward and reverse contactors 32 and 34 controlling the motor 7 to be completed. Therefore, in case the armature of the motor 7 should be short-circuited, a tripping out of the supply system circuit breaker is prevented. Otherwise a tripping of the circuit breaker would be likely to occur upon energization of either the forward or reverse contactor 32 or 34 in response to a closing of the back EMF interlock relay 44.

In case the drive motor 6 should jam or otherwise fail, it is desirable to be able to operate the drive motor 7 independently. This can be accomplished by moving the ganged switches 36 and 37 to the right position in which they engage respectively the stationary contacts 36c and 37c. In this position, the interlock relays 39 and 42 are again by-passed and circuit connections are completed directly to the forward and reverse contactors 32 and 34 controlling the motor 7 in response to movement of the reversing switch 35 to the "lower" or "raise" position. It will be noted that under this condition the circuit connections are such that it is impossible for the forward and reverse contactors 28 and 30 to become energized, whereupon independent operation of the drive motor 7 is obtained.

In case of failure of either of the drive motors 6 or 7, it is desirable that the input shaft 8 or 9 associated with the inactive drive motor be locked, as otherwise the input shaft associated with the inactive motor may rotate and thereby prevent delivery of torque to the load shaft 1. For the purpose of preventing rotation of the input shafts 8 or 9 upon failure of their associated drive motors 6 and 7, shaft-locking devices 25 and 26 are provided. These shaft-locking devices are essentially solenoid-operated brakes, the operation of which will now be described. Since the shaft-locking devices 25 and 26 are identical in construction, only the device 25 will be described in order to avoid repetition. The shaft-locking device 25 comprises a stationary frame 47 to which is bolted a core member 48 around which is wound the solenoid-operating winding 23. An annular armature member 49 is located in magnetic relation with the core 48 and is slidably mounted on the input shaft 9 by means of a spline connection 50. The armature 49 is normally biased to the left by means of a suitable compression spring 51 to a position in which it frictionally engages a friction plate 52 carried on a stationary support 53. Therefore in this position the input shaft 9 is braked or locked so that it cannot rotate. However, when the solenoid winding 23 is energized, the armature 49 is attracted to the right position in which it is disengaged from the friction plate 52 whereby the shaft 9 is free to rotate. Preferably a suitable stop (not shown) is provided on the shaft 9 for preventing movement of the armature 49 to the extreme right position in which it would be moved into rubbing engagement with the end of the core member 48.

As pointed out before, the solenoid windings 23 and 24 of the shaft-locking devices 25 and 26 are connected in series circuit relation with the armatures of the associated drive motors 6 and 7. With such an arrangement it will be apparent that when the drive motors 6 and 7 are energized, the shaft-locking devices will simultaneously be energized to release their associated drive shafts 8 and 9. However, in case either drive motor should fail or should be rendered inactive by operation of the ganged switches 36 and 37, it will be apparent that either the input shafts 8 or 9 will be locked, as the case may be, thereby permitting the remaining actuator motor to drive the load shaft 1 at one-half normal speed.

It should be clearly understood that my invention is not limited to the specific form of shaft-locking means disclosed herein, as it will be apparent to those skilled in the art that other equivalent arrangements may be provided. For example, the desired result may be obtained by the provision of non-reversible gearing between the drive motors 6 and 7 and their associated differential gear input shafts 8 and 9.

Thus it will be seen that I have provided an improved actuator system in which a substantial weight saving is effected without sacrificing the reliability inherent in a multiple motor drive system. With my improved system, the drive motors 6 and 7 need only to be large enough to supply one-half the total power required to operate the load shaft 1 at normal torque and speed. In case of failure of either drive motor, the differential gear arrangement results in full torque being delivered to the load shaft 1 without any overloading of the remaining motor. Furthermore, by virtue of the sequential motor-starting arrangement, the load is picked up smoothly without high transient stresses, and the peak starting currents are much lower than would be the case if both the drive motors were started simultaneously. The smooth starting feature is particularly advantageous when the actuator system is used to operate aircraft wing flaps as it avoids sudden changes in pitch attitude when the flaps are lowered or raised. Also the switching arrangement by means of which either drive motor may be operated independently of the other gives great flexibility and reliability of operation. This latter aspect is particularly important in military aircraft where either drive motor may be put out of commission by enemy gunfire.

While I have shown and described particular embodiments of my invention, will occur to those skilled in the art that various changes and modifications may be made without departing from my invention, and I therefore aim in the appended claim to cover all such changes and modifications as fall within the true spirit and scope of my invention.

What I claim as new and desire to secure by Letters Patent of the United States is:

An actuator system comprising a pair of reversible motors adapted to operate at a constant speed to supply a constant torque to a load, differential gear means having an output shaft adapted to be connected to said load, shaft locking means interconnecting each of said motors with said differential gear means, means for selectively releasing said shaft locking means in response to the energization of the motor associated therewith, forward and reverse contactors associated with each of said motors for controlling their direction of rotation, reversing switch means for jointly controlling the forward and reversing contactors of said motors, and an interlock relay responsive to the back EMF of one of said motors for delaying closure of the contactor associated with the other of said motors until said back EMF reaches a predetermined value corresponding to a predetermined motor speed, whereby said motors operate to supply a constant torque at rated speed to said load and are adapted upon failure of either motor to supply the same torque to the load at one-half rated speed.

BRUCE A. WELLS.

REFERENCES CITED

The following references are of record in the file of this patent:

UNITED STATES PATENTS

| Number | Name | Date |
|---|---|---|
| 436,127 | Edison | Sept. 9, 1890 |
| 855,623 | Emerson | June 4, 1907 |
| 933,506 | Walpole | Sept. 7, 1909 |
| 1,130,053 | Barnum | Mar. 2, 1915 |
| 1,235,132 | Gaylord | July 31, 1917 |
| 1,552,235 | Russell | Sept. 11, 1925 |
| 1,578,925 | Seeger | Mar. 30, 1926 |
| 1,667,718 | Connell | May 1, 1928 |
| 2,300,343 | Clay | Oct. 27, 1942 |